(No Model.)
J. B. WHITE.
EXPANSION JOINT.
No. 247,591. Patented Sept. 27, 1881.
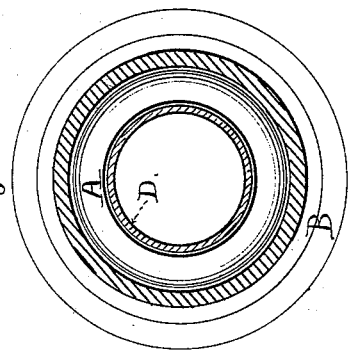
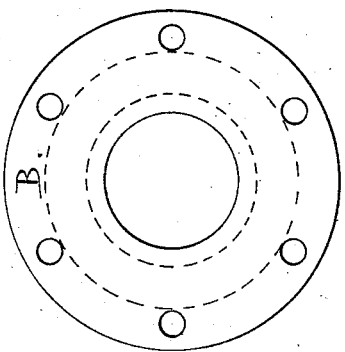
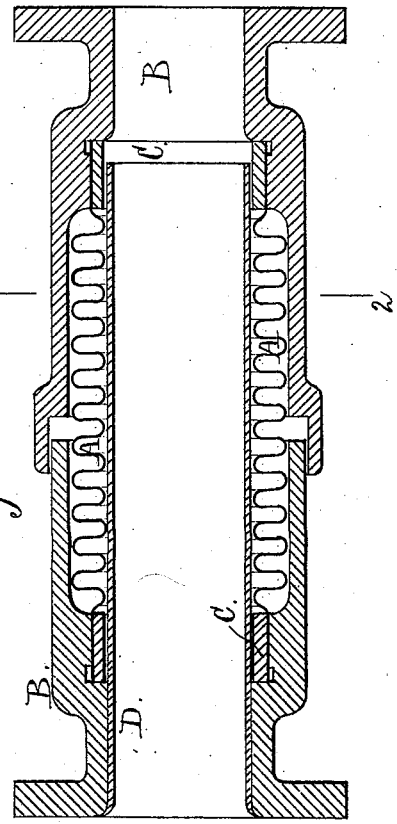
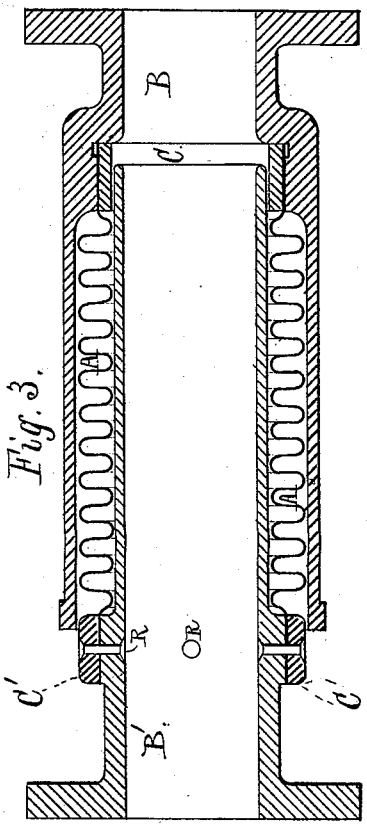
Witnesses:
H. W. Brinckerhoff
Theodore Paschke
Inventor:
Joseph B. White

UNITED STATES PATENT OFFICE.

JOSEPH B. WHITE, OF BROOKLYN, NEW YORK.

EXPANSION-JOINT.

SPECIFICATION forming part of Letters Patent No. 247,591, dated September 27, 1881.

Application filed July 14, 1881. (No model.)

*To all whom it may concern:*

Be it known that I, JOSEPH B. WHITE, a citizen of the United States, residing at Brooklyn, in the county of Kings and State of New York, have invented a new and useful Expansion-Joint, of which the following is a specification.

My invention relates to improvements in expansion-joints for pipes conveying gases or fluids of varying temperatures; and the objects of my improvements are, first, to provide for the movement of the pipe or pipes, due to the changes of temperature, with a minimum of strain upon the joints and fastenings of the pipes; second, to provide a joint which will require no attention or packing, and with as few parts as possible. I attain these objects by the arrangements illustrated in the accompanying drawings, in which—

Figure 1 is a longitudinal central section of my invention; Fig. 2, a cross-section on the line 1 2, Fig. 1; Fig. 3, a modification of Fig. 1, and Fig. 4 an end view common to both Figs. 1 and 3.

Similar letters refer to similar parts throughout the several views.

A in Fig. 1 is a piece of seamless or other tube, of metal or other suitable material, corrugated circularly by rolling between rollers or otherwise its entire length, excepting at the ends, where a sufficient portion is left plain to allow said tube to be slipped in suitably-prepared cylindrical flanged shells B B. A ferrule or ring, C, having been placed inside of each end of the corrugated tube A, the ferrules or rings are then set out with a boiler-tube expander or other means, so as to make a perfectly tight joint between the tube and shells. The cylindrical shells B B, Fig. 1, extend over and protect the corrugated tube A from injury from without and rupture by internal pressure. A pipe, D, secured at one end to one shell B, Fig. 1, and free to move at the other to allow an independent movement of the shells B B, is placed inside of the corrugated tube A for the purpose of protecting the tube A from injury from within and collapse, should the internal pressure become less than that of the atmosphere, and also to afford a smooth and unobstructed passage for the gases or fluids.

Fig. 3 is a modification of Fig. 1, and shows another method of carrying out the same purpose. In this Fig. 3 the shells B and B' are so constructed that one of them, B, covers and protects the whole length of the corrugated tube A on the outside, and the other shell, B', protects the whole length of the tube A on the inside, in place of the pipe D in Fig. 1. This arrangement necessitates putting the ring C' on the outside of the shell B' and tube A, in which case it will simply be forced or shrunk on with sufficient pressure to form a tight joint, and for further security a few rivets or bolts, R, may be put through the parts.

The operation of my invention is as follows: When the temperature of the fluids or gases passing through the pipe or pipes varies to such an extent as to cause the pipe or pipes, which may be bolted or otherwise secured to the flanges of the shells B B, to expand or contract the corrugated tube A will shorten or lengthen, as the case may be, and the construction of the invention is such as to allow the shells B B to move freely on each other, as the corrugated tube A may vary in length.

Having fully described my invention, what I desire to claim, and secure by Letters Patent, is—

1. In a pipe subject to changes of length, an expansion-joint of corrugated tubing secured at each end to independent shells or pipes by ferrules or rings, substantially as described.

2. In a pipe conveying fluids or gases of varying temperatures, an expansion joint of corrugated tubing incased in protecting shells or pipes, so as to preserve it from accidental injury or deformations, and to prevent bursting from internal or collapsing by external pressure, all substantially as set forth.

JOSEPH B. WHITE.

Witnesses:
H. W. BRINKERHOFF,
THEODORE PASCHKE.